United States Patent

[11] 3,631,418

[72] Inventor Thaddeus F. Bryzinski
West Webster, N.Y.

[21] Appl. No. 880,188
[22] Filed Nov. 26, 1969
[45] Patented Dec. 28, 1971
[73] Assignee Stromberg-Carlson Corporation
Rochester, N.Y.
Original application Jan. 22, 1968, Ser. No. 699,673, now Patent No. 3,513,538, dated May 26, 1970. Divided and this application Nov. 26, 1969, Ser. No. 880,188

[54] FILAMENTARY MAGNETIC MEMORY
1 Claim, 10 Drawing Figs.

[52] U.S. Cl. .......... 340/174 PW, 340/174 M, 340/174 TF, 340/174 VA
[51] Int. Cl. .......... G11c 5/02, G11c 11/04, G11c 11/14
[50] Field of Search .......... 340/174 TF, 174 PW

[56] References Cited

UNITED STATES PATENTS

| | | | |
|---|---|---|---|
| 3,425,042 | 1/1969 | Maeda et al. .......... | 340/174 |
| 3,493,945 | 2/1970 | Semienko .......... | 340/174 |

*Primary Examiner*—James W. Moffitt
*Attorney*—Charles C. Krawczyk

ABSTRACT: An array of spaced, insulating lands in cast in situ upon a printed circuit card bearing spaded, parallel conductive strips. The lands are aligned normally across the strips. Stretchable filaments are placed in the grooves between the lands, and a second card, identical to the first is cemented upon the array of lands in opposed registration with the first card. The filaments are pulled out, leaving elongated apertures to receive filamentary magnetic memory elements. Connections are made through the cards to the conductive strips by any convenient means such as by electroplating through holes to connect the strips to an external circuit.

INVENTORS
THADDEUS F. BRYZINSKI

*INVENTOR*
THADDEUS F. BRYZINSKI

INVENTOR
THADDEUS F. BRYZINSKI

FILAMENTARY MAGNETIC MEMORY

This patent application is a division of a copending application, Ser. No. 699,673, filed on Jan. 22, 1968 and now U.S. Pat. No. 3,513,538.

BRIEF SUMMARY OF THE INVENTION

This invention relates to novel magnetic memories, and, more particularly, to novel arrays of thin film magnetic memory elements and methods of making them.

This application is a companion of the following concurrently filed copending applications:

Ser. No. 699,672, filed Jan. 22, 1968 and now U.S. Pat. No. 3,501,830 entitled "Filamentary Magnetic Memory And Methods Of Making It Using Flexible Sheet Material."

Ser. No. 699,674, filed Jan. 22, 1968 and now U.S. Pat. No. 3,495,228 entitled "Filamentary Magnetic Memory Including Word Straps Constituting More Than One Turn Around Each Magnetic Filament."

There has been much recent interest in thin film magnetic memory devices of the type including filaments such as wires coated with thin films of magnetic material, typically applied by electrolysis, or by evaporation in vacuo. See, for example, an article entitled, "Plated Wire Magnetic Film Memories" by U. F. Gianola, at page 408 of the Bell Laboratories Record, Vol. 42 (Dec. 1964). The filaments are typically about 0.004 to 0.005 inch in diameter, and the thin film magnetic material is typically about 1 micron thick. The output signals produced in the operation of devices of this type are relatively small, typically on the order of a few millivolts, and it is important to achieve a high degree of uniformity in the spacings between successive wires when they are arranged in parallel array to form a matrix, otherwise variations in coupling between the wires and crossing conductors at different points along the lengths of the wires may tend to introduce errors into the system. And in the interest of space conservation, it is desirable to space the wires as closely together as possible.

Briefly, in accordance with the invention, an array of filaments, each coated with a thin film of magnetic material, is arranged in a sandwich construction between two sheets of insulating material, on the mutually facing sides of which electrical conductors are arranged in opposed registration to each other and orthogonally to the filaments. Small strips of insulating material cast in situ are fixed to the insulating sheets between successive ones of the filaments. The sheets of insulating material may be either flexible or rigid, and if flexible, the assembly is rigidized by the provision of suitable supporting plates. Arrangements are made to make electrical connections to the conductive strips carried on the insulating sheets and to the filaments.

In accordance with the methods of the invention, the laminated construction is built up in stepwise fashion, and the opposing insulating sheets are bonded together with stretchable filaments in place of the magnetically coated filaments. The stretchable filaments are selected to be of a material relatively resistant to the adhesive action of the bonding agent, and are of slightly larger diameter than the magnetically coated filaments. After the insulating sheets have been bonded, and the bonding agent cured, the stretchable filaments are withdrawn, which can be readily done because of the "necking down" action caused by stretching. The magnetically coated filaments are then inserted into the tunnellike apertures left after removal of the stretchable filaments.

When the insulating sheets are initially flexible, terminal portions of the sheets may be folded back upon the main body of the laminate to facilitate making electrical connections to the conductors carried by them. When the insulating sheets are rigid, holes are first drilled through them, penetrating also the respective conductors carried by them. Connections are then made to the conductors through the holes to conductive elements on the opposite sides of the sheets by any desired method such as, for example, by electroplating.

DETAILED DESCRIPTION OF THE INVENTION

The invention will now be described in greater detail in conjunction with the accompanying drawings, wherein.

Figure 1:
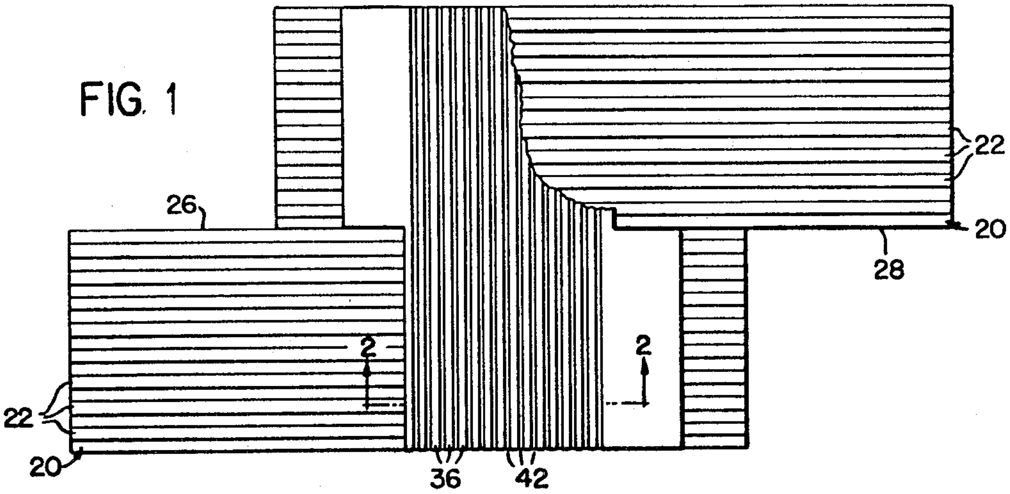
FIG. 1 is a plan view illustrating one step in the manufacture of a magnetic memory device according to the invention.
Figure 2:
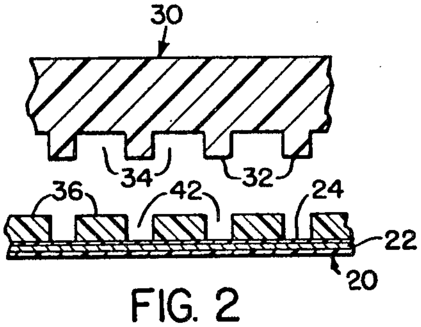
FIG. 2 is a cross-sectional view taken along the line 2—2 of FIG. 1, and showing removal of the mold used to cast the insulating lands in situ.
Figure 4:
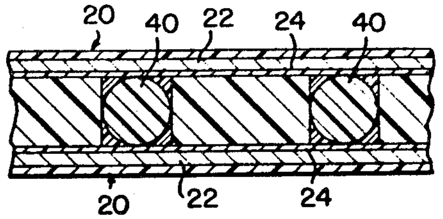
FIG. 4 is a cross-sectional view, on an enlarged scale, of the laminate shown in FIG. 3.
Figure 3:
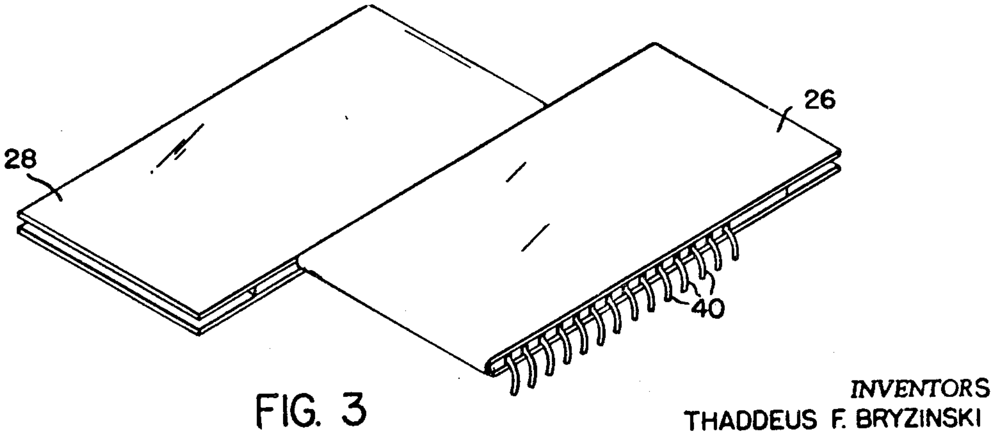
FIG. 3 is an isometric view illustrating another step in the manufacture of the memory device.

A magnetic memory device according to a first embodiment of the invention, and the presently preferred method of making it are illustrated in FIGS. 1 to 6.

As shown, the initial starting material is a sheet 20 of flexible insulating material such as a synthetic resin commercially available under the trade name Mylar, having strips 22 of a conductive material such as copper foil bonded to one surface in close spaced parallel array. Typically, the sheet 20 is about 0.001-inch thick, and the strips 22 are about 0.025 inch in width, spaced on about 0.05 inch centers, and about 0.0014-inch thick. A coating 24 of an insulating material is applied over the conductive strips 22. This may be conveniently done, for example, by electroplating a synthetic resin, which process facilitates accurate control of the thickness of the coating, preferably about 0.0005-inch thick. The sheet 20 is laid upon a support (not shown) with the surface bearing the conductive strips 22 facing up. It is cut, as shown, with diagonally opposed, laterally projecting tab portions 26 and 28.

A mold 30 is prepared of a resinous material such as polystyrene, having a striated surface comprising lands 32 separated by grooves 34, the lands being of generally square cross section. In the case where the array is to include magnetically coated filaments about 0.005 inch in diameter, the lands 32 are made about 0.008 inch on a side, and the grooves about 0.017 inch wide. A selected area of the upwardly facing surface of the insulating sheet 20 centrally disposed between the tab portions 26 and 28 is then coated with a hardenable insulating material such as, for example, a liquid monomer of an epoxy resin. The mold 30 is then pressed upon the surface in accurately predetermined alignment, with the lands 32 and grooves 34 of the mold normal to the conductive strips 22 on the insulating sheet. The lands 32 displace the liquid resin from those areas of the conductive strips contacted by them, and the liquid resin substantially completely fills the grooves 34 of the mold. Excess resin is cleared away, and the resin remaining under the mold 30 is cured. The mold 30, being made of polystyrene, may then be removed without dislodging the resin just cured on the sheet. The resin cured in the grooves of the mold constitutes lands 36 bonded to the insulating sheet 20 and through the resin 24 to the conductive strips 22.

Filaments 40 of a stretchable material selected for its resistance to adhesion to a bonding agent to be used in a subsequent step are then laid in the grooves 42 between the lands. In the typical case where the grooves 42 are about 0.008 inch in depth and width, the stretchable filaments 40 may be, for example, nylon monofilaments about 0.008 inch in diameter. A bonding agent such as a curable epoxy cement is then spread upon the array of lands 32, grooves 42, and filaments 40, covering all of the striated surface and filling the space in each of the grooves around the stretchable filaments. The opposed tab portions 26 and 28 of the flexible sheet are then folded over upon the cement covered striated surface and carefully aligned so that the conductive strips 22 remain in registration, each one being folded directly back upon itself. The bonding agent is then cured, with the assembly under pressure.

After the bonding step, stiffening plates 44 and 46 of an insulating material such as, for example, glass fiber reinforced epoxy resin, are then cemented on the opposite sides of the structure. The stiffening plates are coextensive with the folded structure, except that their tab portions 48 and 49 are shorter than the tab portions 26 and 28 of the flexible sheet. Those parts of the tab portions 26 and 28 of the flexible sheet that extend beyond the tab portions 48 and 49 of the stiffening plates are then folded back over and cemented to the stiffening plates to expose the conductive strips 22 for connection to external circuitry. The insulating coating 24 may be readily removed from the folded back portions of the conductive strips 22, which then form an array of terminal tabs that can be mated with a spring-finger receptacle (not shown).

The stretchable filaments 40, being of a material to which the bonding cement does not well adhere, and having a tendency to "neck down" when subjected to tension, may be readily withdrawn from the assembly at this point. The assembly is cemented to a baseplate 52 which mounts terminal pads 54. The magnetically coated filaments 56 are inserted through the holes (not separately designated) left by the stretchable filaments 40, and electrically connected as by soldering to the terminal pads 54. Connections may be made as desired to the conductive strips 22 carried by the insulating sheet material, preferably by so-called plug-in arrangements. Each one of the conductive strips 22 constitutes a single turn coil around each of the magnetically coated filaments.

The embodiments shown in FIG. 7 includes two relatively rigid printed circuit boards 60 and 62, in place of the flexible sheet material 20 described in connection with the embodiment shown in FIGS. 1 to 6. In this case, it is not possible to bend the conductive strips 64 back upon themselves as in the first embodiment to form terminal tabs and thus to effect electrical connections to the conductive strips. Such connections are effected in this embodiment of the invention by so-called plate-through techniques. Holes 66 and 68 are drilled or punched through the rigid insulating sheets 60 and 62 extending through the conductive strips 64, one hole 66 or 68 at each end of each conductive strip. The edge portions of the sheet 60 and 62 are immersed in an electroplating bath having a high degree of throwing power such as, for example, silver-plating bath, and electroplated to form conductive extensions of the strips 64 through the holes 66 and 68, to which connection may be made in any desired way. At one end of each strip 64, it is normally desired to connect it to the strip in registration with it on the opposite insulating sheet. This is done simply by dropping a wire 70 through the two holes 66 and soldering the wire to the plated extensions.

The construction is otherwise generally similar to the embodiment shown in FIGS. 1 to 6, except that the stiffening boards 44 and 46 may be omitted, the terminal pads 54 secured on the outer surfaces of the main rigid sheets 60 and 62 may constitute the card edge connectors. It is believed that it will usually be desirable to mount the assembly shown in FIG. 7 on a separate base plate generally similar to the plate 52 shown in FIG. 6.

Figure 10:
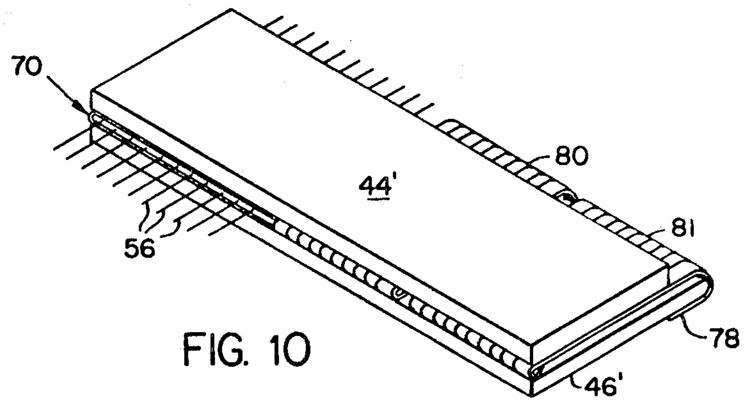
FIG. 10 is an isometric view of the device shown in FIGS. 8 and 9, showing the device as completed except for mounting on a base support.
Figures 8, 9:
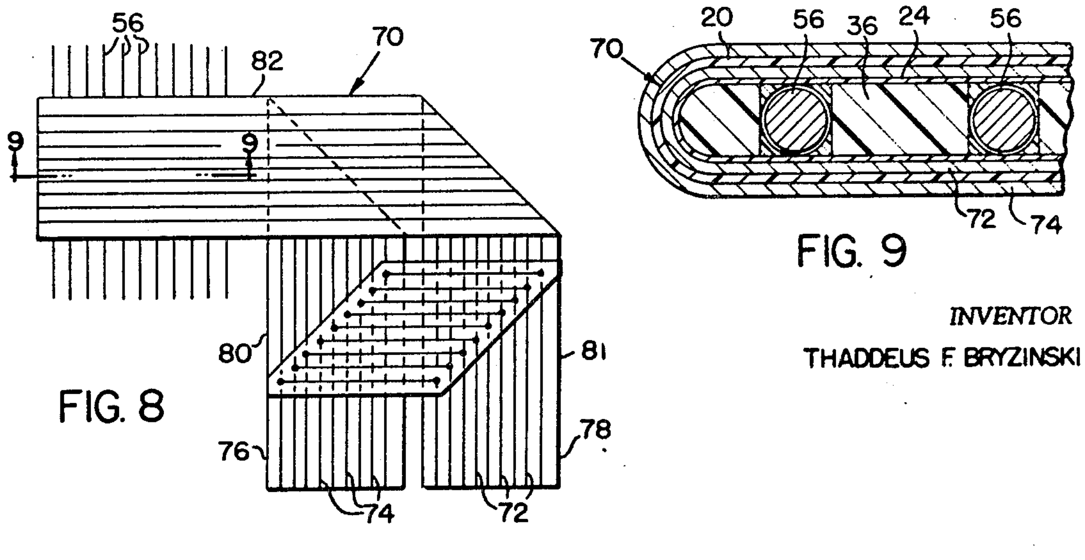
FIG. 8 is a plan view, in schematic form of a magnetic memory device according to another modification of the invention.
FIG. 9 is a fragmentary, longitudinal sectional view, on an enlarged scale, of the device shown in FIG. 8.

In accordance with another embodiment of the invention, as shown in FIGS. 8, 9, and 10, the insulating sheet 70, in this case of flexible material, mounts conductive strips 72 and 74 on both of its faces, and they are connected so as to form coils each having two turns around the magnetically coated filaments 56. In this way, the magnetic flux applied to the magnetically coated filaments may be substantially doubled without increasing the current through the conductive strips 72 and 74 relative to the flux produced by the single turn strips 22 and 64 in the other embodiments.

As shown, the construction is generally similar to the construction illustrated in FIGS. 1 to 6, except that the flexible sheet 70 carries conductive strips 72 and 74 on both of its faces, and it is folded in one direction only around the molded array of insulating lands 36. The conductive strips 72 and 74 may be connected to an external circuit by any desired means. Preferably, however, in accordance with the invention, the strips 72 on one face of the sheet are separately connected to respective ones of the strips 74 on the opposite face, as shown in FIG. 8.

Figure 5:
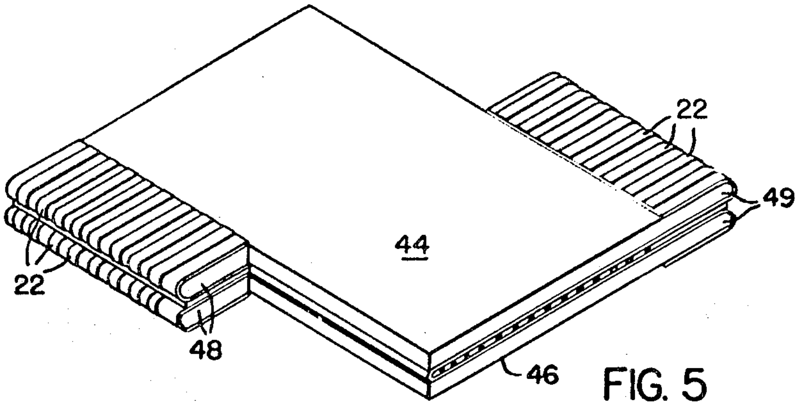
FIG. 5 is an isometric view generally similar to the view of FIG. 3, but showing further steps in the manufacture of the device.
Figure 6:
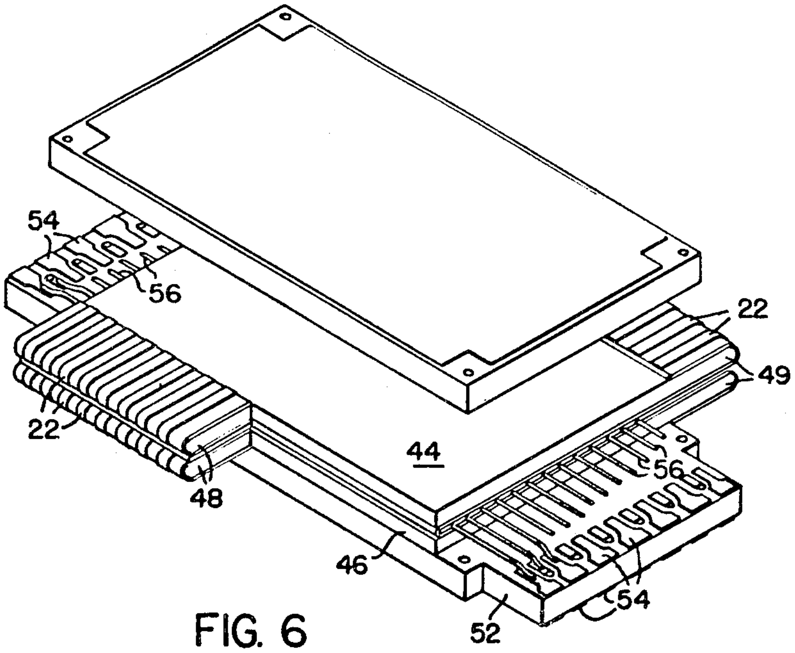
FIG. 6 is an exploded isometric view generally similar to the views of FIGS. 3 and 5, but showing the final manufacturing steps.
Figure 7:
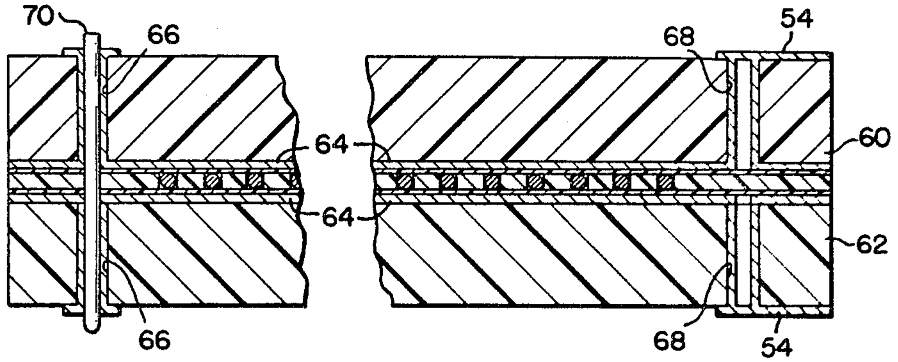
FIG. 7 is a fragmentary cross-sectional view on an enlarged scale of a memory device according to a modified form of the invention.

Terminal end portions 76 and 78 may then be folded back upon and cemented to stiffening boards 44' and 46' in similar manner as shown in FIGS. 5 and 6, and external connections made only to terminal portions of the strips 72 and 74 that lie in juxtaposed array on one surface only of the completed laminate.

Relatively long end portions 80 and 81 of the sheet 70, which extend beyond the array of insulating lands 36, are folded diagonally to extend laterally in juxtaposed position from the looped portion 82 of the sheet. This brings the strips 72 on one face of the sheet into juxtaposition with and facing in the same direction as the strips 74 on the opposite face. The strips 72 are then connected separately to corresponding ones of the opposite strips 74, as shown, to establish two-turn windings around the magnetic filaments 56.

The laterally extending portions of the sheet 70 are then folded back across the main portion and over the edge of a stiffening board 46' to which they are cemented to constitute a terminal strip for insertion into a plug connector (not shown).

What is claimed is:

1. A magnetic memory device comprising:
   a. a first rigid printed circuit card having an array of straight, parallel conductive strips extending over one surface thereof,
   b. a second rigid printed circuit card substantially identical to said first card and having an identical array of conductive strips on one surface thereof,
   c. said first and second cards being closely spaced, parallel, and in register with each other, with said strips on said first card facing and in register with said strips on said second card,
   d. insulating spacer elements between and bonded to both of said cards on the surfaces having the strips and extending normally to said strips providing insulated passageways for receiving separate filamentary magnetic signal storage elements,
   e. filamentary magnetic signal storage elements in said insulated passageways,
   f. conductive pads on the outer surfaces of said cards at one end of the cards in registration with end portions of said strips,
   g. means at one end of each of said cards extending through the cards for connecting the end portions of separate ones of said strips to separate ones of said conductive pads, and
   h. means at the other end of each of said cards extending through both of said cards to connect separate ones of the strips on the first card to separate ones of the strips on the second card that are in registration.

* * * * *